United States Patent [19]

Kent

[11] Patent Number: 5,086,492
[45] Date of Patent: Feb. 4, 1992

[54] SWITCHING CURRENT REGULATOR FOR MOTOR CONTROL

[75] Inventor: David L. Kent, Novato, Calif.

[73] Assignee: Motorola, Inc., Schaumburg, Ill.

[21] Appl. No.: 265,304

[22] Filed: Oct. 31, 1988

Related U.S. Application Data

[63] Continuation of Ser. No. 27,982, Mar. 19, 1987, abandoned.

[51] Int. Cl.$^5$ .................................................. H02P 1/00
[52] U.S. Cl. ................................... 388/815; 388/910; 318/739; 318/747; 318/801
[58] Field of Search ......................... 363/93–98; 307/256–257, 112, 130–131; 318/310–317, 254, 354, 721–724, 366–368, 798–801, 805, 739–740, 747; 388/803, 806, 809, 815, 816, 910, 821–823

[56] References Cited

U.S. PATENT DOCUMENTS

| | | | |
|---|---|---|---|
| 3,436,635 | 4/1969 | James et al. | 318/368 |
| 3,569,811 | 3/1971 | Miller | 318/367 |
| 3,582,742 | 6/1971 | Martin | 318/368 |
| 3,609,495 | 9/1971 | Seesselberg | 318/368 |
| 3,694,722 | 9/1972 | Reed | 318/368 |
| 3,812,409 | 5/1974 | Dinger | 318/317 |
| 3,976,927 | 8/1976 | Puschel et al. | 318/368 |
| 4,242,624 | 12/1980 | Schalk et al. | 318/368 |
| 4,264,785 | 4/1981 | Jacobson | 318/345 B |
| 4,325,095 | 4/1982 | Hart | 363/98 |
| 4,388,579 | 6/1983 | Ellis | 318/732 |
| 4,427,928 | 1/1984 | Kuriyama et al. | 318/376 |
| 4,532,567 | 7/1985 | Kade | 318/434 |
| 4,580,649 | 4/1986 | Ohe et al. | 318/491 |
| 4,582,155 | 4/1986 | Ohe | 318/491 |
| 4,584,506 | 4/1986 | Kaszmann | 318/254 |
| 4,591,014 | 5/1986 | Yasuda | 318/434 |
| 4,633,154 | 12/1986 | Maeda | 318/254 X |
| 4,639,651 | 1/1987 | Shimizu | 318/432 |
| 4,684,944 | 8/1987 | Kerlin | 318/345 |
| 4,687,976 | 8/1987 | Shimizu | 318/432 |
| 4,789,040 | 12/1988 | Morishita et al. | 318/473 |

Primary Examiner—William M. Shoop, Jr.
Assistant Examiner—David Martin
Attorney, Agent, or Firm—Paul F. Wille

[57] ABSTRACT

An improved motor control circuit is disclosed in which energy stored in the motor is transferred back to the power supply rather than being passively dissipated. The sense of a feedback signal is reversed at a summation node by combining the signal with an inverted, amplified reproduction of the signal.

4 Claims, 2 Drawing Sheets

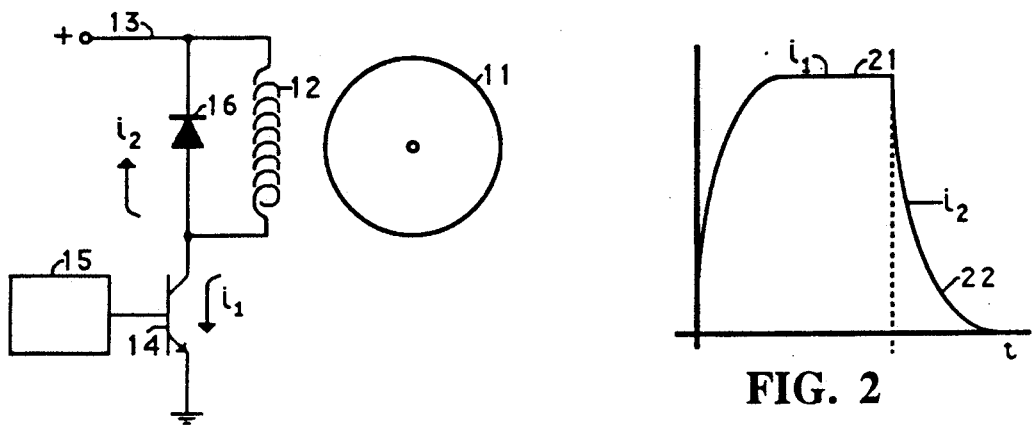
FIG. 1 (Prior Art)
FIG. 2
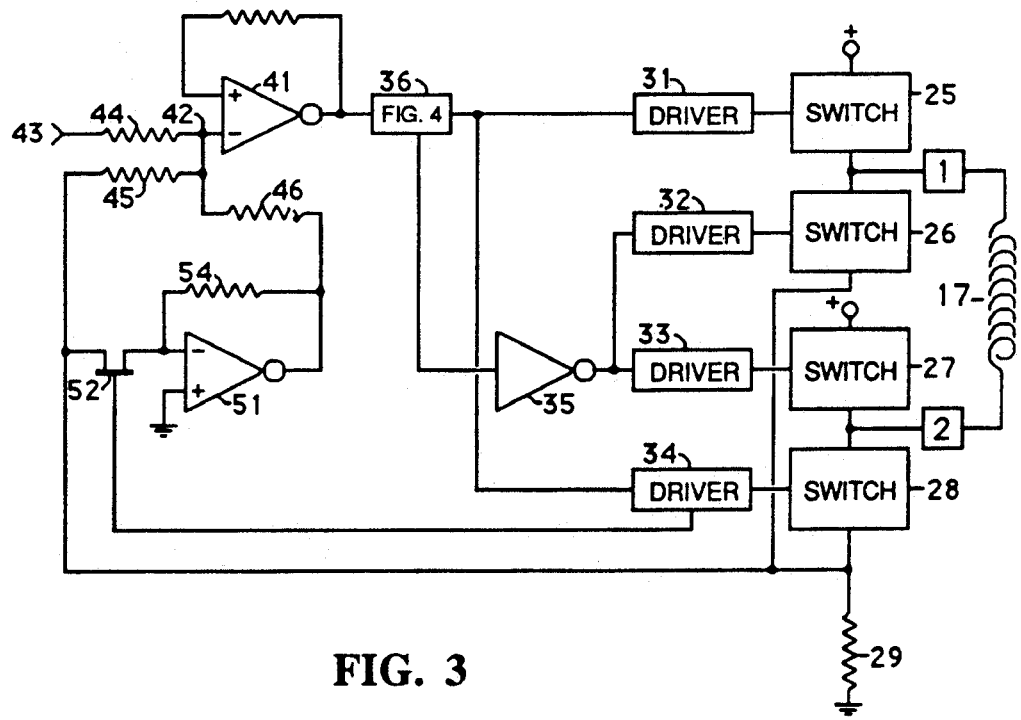
FIG. 3

SWITCHING CURRENT REGULATOR FOR MOTOR CONTROL

This application is a continuation of prior application Ser. No. 07/027,982, filed Mar. 19, 1987, now abandoned.

BACKGROUND OF THE INVENTION

This invention relates to a control circuit for driving a direct current (D.C.) motor and, in particular, to a control circuit for applying a reverse current through a motor to control induced currents.

In the prior art, D.C. motors rather than A.C. motors are used for many applications because of their greater efficiency, compact size, and the ease with which the direction of rotation can be reversed. A problem develops when one does not wish to run the motor continuously or at a steady speed. The question is simply how to control the current through the motor.

A variety of techniques have been proposed or used in the prior art for controlling a D.C. motor. A common technique is to control power by using a variable duty cycle drive current. This technique is also known as pulse width modulation (PWM). A difficulty with this technique, and others, is the need to dissipate reverse current through the windings when the pulse is terminated. Another difficulty is the inertia of the rotor, combined with the reverse current, upsetting the position of the rotor when precise movement is desired. A further difficulty is the fact that PWM systems generally run at a particular frequency, which may restrict the rate at which the motor can be stepped or cause problems with resonance in the system due to insufficient resolution of the resultant current waveform.

In view of the foregoing, it is therefore an object of the present invention to provide an improved current regulator for D.C. motor control.

Another object of the present invention is to provide an improved control system using pulses.

A further object of the present invention is to provide a free-running, pulse control of D.C. motors operating over a wide range of loads.

SUMMARY OF THE INVENTION

The foregoing objects are achieved in the present invention wherein the induced E.M.F. from a collapsing field is absorbed by switching the polarity of the voltage applied to a winding of a D.C. motor. The width of the pulse through the winding is determined by the electrical characteristics of the winding itself. Specifically, the current through the winding is monitored and the applied voltage is terminated and then reversed when a predetermined value of current is reached. The current sensing circuitry compensates for the reverse polarity of the supply voltage in step with the switching. The polarity and magnitude of the resultant winding current are then functions of the duty cycle of the voltage switching waveform.

BRIEF DESCRIPTION OF THE DRAWINGS

A more complete understanding of the present invention can be obtained by considering the following detailed description in conjunction with the accompanying drawings, in which:

FIG. 1 illustrates a D.C. motor having one winding driven in according to the prior art.

FIG. 2 illustrates a waveform useful in understanding the present invention.

FIG. 3 illustrates a preferred embodiment of the present invention.

DETAILED DESCRIPTION OF THE INVENTION

Figure 4:
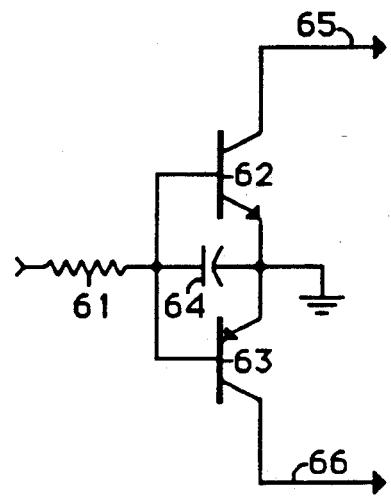
FIG. 4 illustrates a detail of the circuitry of FIG. 3.

In FIG. 1, rotor 11 of a DC motor is driven by an appropriate winding, illustrated in FIG. 1 as coil 12. Coil 12 has one end connected to source 13 of electric current and the other end connected to ground through transistor 14. Transistor 14 has the base thereof connected to driver 15. Driver 15 applies a pulse to the base of transistor 14 turning it on. The current flows from source 13 through coil 12, through transistor 14, to ground. In response to this current, rotor 11 rotates. When the pulse from driver 15 terminates, the current does not immediately stop flowing through coil 12. This is illustrated in FIG. 2 wherein curve 21 illustrates the initial current through coil 12, i.e. while transistor 14 is conducting. Curve 22 illustrates the current through coil 12 after transistor 14 is turned off. The energy stored in the system, in the form of the electric field about coil 12 and the momentum of rotor 11, must be dissipated in some fashion. In the prior art, this current is dissipated by what is known as a ringing diode, such as diode 16. Basically, diode 16 simply provides a short circuit about coil 12. Diode 16 typically has a low resistance in the forward conducting direction. Thus the energy stored in the system may take an unpredictably long time to dissipate. This unnecessarily compromises the accuracy of the PWM control. Thus, it may become quite difficult to cause rotor 11 to rotate in uniform steps. In addition, the energy stored is not returned to the power supply but is passively dissipated through the ringing diode, compromising efficiency.

In accordance with the present invention, the energy stored in the DC motor is transferred at a faster, more linear rate to the power supply. This is accomplished by applying a reverse current through coil 17 to drive the current induced by the collapsing field to zero. In particular, as illustrated in FIG. 3, coil 17 is connected between terminals 1 and 2. Terminal 1 is connected to the juncture of switches 25 and 26. Terminal 2 is connected to the juncture of switches 27 and 28. These pairs of switches are connected between a source of current and ground through sense resistor 29. Sense resistor 29 comprises a small resistance, e.g. on the order of a few ohms, for converting current to voltage to provide a feedback signal as described more fully herein. As thus described, switches 25-28 form a bridge circuit having a current source connected across one diagonal of the bridge and coil 17 connected across the other diagonal.

Switches 25-28 are controlled by suitable drivers 31-34, respectively. Drivers 31 and 34 are controlled by one output from control circuit 36, while drivers 32 and 33 are connected to a second output from control 36. Drivers 32 and 33 are connected to this second output by way of inverter 35.

In operation, the outputs from control circuit 36 are in phase and one of the output signals is inverted by inverter 35. Thus, for example to provide current in a first direction through coil 17, drivers 31 and 34 are provided with a signal which causes switches 25 and 28 to turn on. Simultaneously, since the control signal is inverted, drivers 32 and 33 cause switches 26 and 27 to turn off. Thus the current flows through switch 25, coil 17, switch 28 to sense resistor 29. At an appropriate time, as described further herein, the output from control circuit 36 reverses the current through the winding by turning off switches 25 and 28 and turning on switches 26 and 27. Thus the current flows from the source through switch 27, through coil 17 in the opposite direction, through switch 26 to sense resistor 29.

The control signal sent to switch control circuit 36 is obtained from error comparator 41 which has summation node 42 connected to the inverting input thereof. Summation node 42 receives a variable reference signal from input 43 by way of resistor 44. Another input is an unmodified sense voltage from resistor 29, coupled by way of resistor 45. Coupling resistor 46 may, or may not provide a signal depending upon whether or not an input is provided to inverter 51 by way of switch 52. If switch 52 is closed, the sense signal is coupled to the inverting input of inverter 51. Inverter 51 then inverts and doubles the sense signal received from resistor 29. This has the effect of providing a negative sense signal to summation node 42.

Switch 52 is controlled by a signal from driver 34. The signal is such that switch 52 is opened when driver 34 closes switch 28 and switch 52 is closed when driver 34 opens switch 28. Thus, by the cooperation of elements 51, 52, 54, and 34, when the current is flowing through coil 17 in a first direction, switch 52 is open and the voltage at node 42 is simply the sum of the voltages from input 43 and sense resistor 29. When the current is reversed through coil 17, the voltage on resistor 29 has the wrong sense and would drive the circuitry in the wrong direction. This is corrected because switch 52 is closed, coupling the signal to inverter 51 which inverts and doubles the voltage. Now, the sum of the voltages at node 42 comprise the sense voltage from resistor 29, coupled by way of resistor 45, minus twice the sense voltage, coupled by way of resistor 46, and a reference voltage coupled by way of resistor 44. The voltages at resistors 45 and 46 combine to produce a reversed sense voltage from resistor 29. Thus, the operation of the circuit is stable, yet the operation is such simpler because the circuitry does not have to detect direction.

In its overall operation, the circuit of FIG. 3 receives a reference signal at input 43, e.g. from a digital to analog converter (DAC), representative of a particular drive current in order to rotate rotor 11 a predetermined distance. This causes comparator 41 to produce an error signal which is coupled to switch control circuitry 36. Switch control circuitry 36 turns on switches 25 and 28. The current through coil 17 is sensed by resistor 29 and is continuously monitored by error comparator 41. At some point, the signal from error comparator 41 passes through zero, causes switch control circuitry 36 to reverse the connection of coil 17. By virtue of the tap in driver 34, switch 52 is closed at the same time that the connections to coil 17 are reversed. Thus the signal from resistor 29 has the appropriate value at node 42 for comparator 41 to operate correctly. Comparator 41 will continue to operate the circuit, nullifying the current caused by the collapsing field. At this point, the step is completed and the circuitry reverts to its initial condition for the next cycle, thereby continuing to rotate rotor 11 until such time as the rotation is terminated as directed by the variable reference signal applied to input 43.

FIG. 4 illustrates switch control circuitry 36 in greater detail. Specifically, switch control circuitry 36 comprises input resistor 61, connected to the bases of transistors 62 and 63. These transistors have their emitters connected directly to ground. In addition, filter capacitor 64 is connected between the bases of the transistors and ground to provide a small amount of smoothing of the input signal. Collector 65 of transistor 62 is connected to drivers 31 and 34 while collector 66 of transistor 63 is connected to drivers 32 and 33, by way of inverter 35.

As thus constructed, one obtains several benefits which enhance the operation of the present invention. A first is that there is a break-before-make operation of the switches since transistors 62 and 63 are simultaneously turned off at low input voltages because their emitters are connected to ground directly. In addition, some delay is obtained by virtre of the time constant of resistor 61 and capacitor 64.

Figure 5:
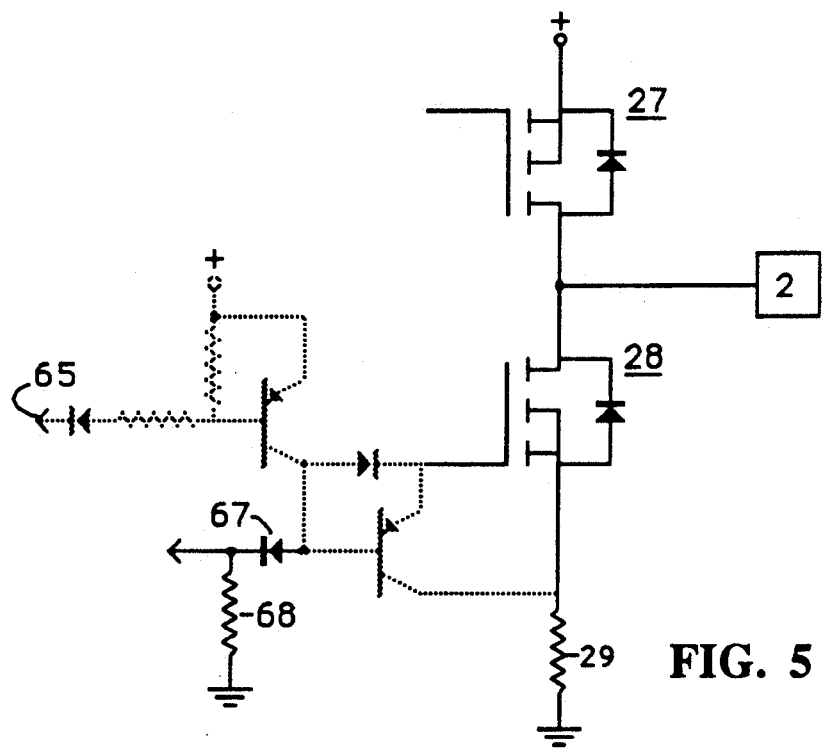
FIG. 5 illustrates a preferred embodiment of the devices for the switches in FIG. 3.

FIG. 5 illustrates a preferred embodiment of the switching arrangement shown in FIG. 3. Specifically, switch 27 comprises what is known as a power MOSFET such as type number IRF9541, while switch 28 comprises a power MOSFET, type IRF541. These devices have extremely short switching times and thus do not limit the switching speed of the circuit. The switching speed of the circuit is limited by the inductance of coil 17 as well as the time constant of the amplifiers and, in particular, of switch control 36. Nevertheless, the circuit operates in a free running mode up to several tens of kilohertz.

FIG. 5 also illustrates the connection made to driver 34 to tap a control signal for switch 52. Driver 34, illustrated in light lines, is connected to switch 52 by way of diode 67 and resistor 68. Switch 52, which preferably comprises a type AH-5020 MOSFET, is a virtual ground analogue switch which conducts when the input to its gate is low. Thus, switch 52 conducts when switch 28 is turned off by driver 34.

There is thus provided by the present invention an improved DC motor control circuit in which the energy stored in the system is not dissipated but rather is coupled back to the power supply at a predictable, linear rate. The result is improved operation of the motor by virtue of a more precise termination of the signal applied thereto. Also, there is inherently no additional error introduced at zero crossing since the polarity and magnitude of the average current is a function of duty cycle of the switching voltage waveform. Also, the load can be fully utilized and still achieve true bipolar operation unlike conventional techniques which use a split winding with a common center-tap connected to a voltage source.

Having thus described the invention, it will be apparent to those of skill in the art that various modifications can be made within the spirit and scope of the present invention. For example, the particular types of devices chosen is given by way of example only and should not be construed as limiting.

I claim:

1. Apparatus for controlling the rotation of a direct current motor having a winding through which electrical current flows comprising:
   current sensing means for sensing the current through said winding and providing a voltage indicative of the current through said winding;
   amplifying means having a summation input for receiving said voltage and producing a direction change signal when said voltage reaches a predetermined magnitude;

switch means having an input for receiving said voltage, a control input for receiving said direction change signal, and an output;

inverter means having an input thereof coupled to the output of said switch means, said inverting means reversing the sense of said voltage and having an output thereof connected to said summation input;

means for selectively connecting said winding to a source of direct current so that current alternately flows in either a first or a second direction through said winding in response to said direction change signal;

wherein the net current through the winding determines the rotation of the direct current motor.

2. The apparatus as set forth in claim 1 wherein said inverter produces an output signal having an amplitude which is twice that of said voltage.

3. The apparatus as set forth in claim 1 and further comprising means for coupling an external signal to said summation input.

4. The apparatus as set forth in claim 1 wherein said switch means forms an open circuit when the current in said winding is in said first direction and forms a closed circuit when the current in said winding is in said opposite direction.

* * * * *